United States Patent Office 2,912,331
Patented Nov. 10, 1959

REISSUED
Feb. 26, 1963
Re. 25,337

2,912,331
DRY FEED PRODUCT AND METHOD OF MAKING SAME

Willard Turner and Kenneth N. Wright, Decatur, Ill., assignors to A. E. Staley Manufacturing Company, Decatur, Ill., a corporation of Delaware No Drawing. Application January 7, 1957
Serial No. 632,658

18 Claims. (Cl. 99—6)

The present invention relates generally to a new and improved feed material and method of making the same. This feed material utilizes soybean millfeed as a carrier, the millfeed being impregnated with a substantial quantity of a feed ingredient of the type which is substantially non-drying due to its very hydrophyllic and hygroscopic properties, the impregnated soybean millfeed in its dried condition being free flowing and adapted for use as a dried feed product for poultry or livestock or as a dry mix in feed formulation.

Hydrophyllic and hygroscopic feed ingredients such as blackstrap molasses, corn sugar molasses (hydrol), corn steep liquor, glutamate mother liquor (such as hydrolyzed corn protein) and choline chloride are extremely difficult if not impossible to dry for use in the formulation of feed products. Feed ingredients of this nature cannot be readily dried or ground due to their adherent properties. Efforts have been made to provide suitable carriers for these feed ingredients to obtain a storable type of feed material which will not cake or form lumps. In utilizing carriers it has been generally found that the carrier particles are merely surface coated and extensive drying of the feed ingredient coatings is necessary to prevent caking or lumping during storage or handling of the finished product. Hydrophyllic and hygroscopic feed ingredients are not only substantially non-drying but are heat sensitive in temperature ranges capable of removing adequate quantities of the water content so as to eliminate the adherent or sticky properties. Consequently, with surface coating of carrier particles it is still necessary to at least substantially dry the feed ingredient coating and the difficulties accompanying drying material of this nature are still present and must be overcome in order to provide a free flowing feed product.

It is an object of the present invention to provide a new and improved feed material utilizing soybean hull containing millfeed as a carrier, the carrier particles being impregnated wtih a hydrophyllic and hygroscopic feed ingredient which, due to its being substantially absorbed within the carrier, does not interfere with the obtaining of a dried, free flowing feed material readily storable without caking and adapted for dry mixing with other feed materials.

A further object is to provide a new and improved feed material formed primarily from soybean hulls impregnated with a hydrophyllic and hygroscopic feed ingredient, the dried feed material being readily adapted for packaging, storing, handling and transporting in any type of conveniently used means without caking or lumping, the material being further adapted for dry mixing with other feed materials and for dry feeding, if desired, the dry mixing of the feed material with other feed ingredients being accomplished without increasing the moisture content of the final feed product.

An additional object is to provide a process of forming the new and improved feed material of the present invention, the process being of an uncomplicated and economical nature and adapting the finished product for efficient drying under substantially non-critical drying conditions without requiring the use of elaborate or expensive drying equipment.

Other objects not specifically set forth will become apparent from the following detailed description of the present invention.

The feed material of the present invention is prepared from soybean millfeed and substances or ingredients which are exceedingly hydrophyllic or hygroscopic, such as blackstrap molasses, corn sugar molasses, corn steep liquor, glutamate mother liquor which for example may be hydrolized corn protein, and choline chloride. The foregoing are known feed ingredients and it should be understood that other feed ingredients of a hydrophyllic and hygroscopic, substantially non-drying nature may also be used in forming the feed material of the present invention. The soybean millfeed is a known by-product resulting from the manufacture of soy flour or grits and formed essentially from soybean hulls, the outer covering of the soybean, with or without soybean offal and tailings from the mill. Soybean meal may be included for the purpose of increasing the protein content of the feed material. Any carrier containing a high level of soybean hulls may be used.

It has been found that soybean hulls constitute a highly desirable carrier for hydrophyllic and hygroscopic feed ingredients as the hulls are especially absorbent. In mixing a feed ingredient wtih soybean hulls, the ingredient is absorbed by each hull particle to an extent that the surface area of the hull particle remains substantially constant and is not increased by an external coating of the feed ingredient. In other words the hygroscopic feed ingredient penetrates into the millfeed particles to an extent that subsequent drying of the product is readily attained. Due to the extent of penetration or absorption accompanying the use of soybean hulls, aggregates of the hygroscopic ingredient cannot form. Moisture can be readily evaporated from the surface area of the millfeed particles during the drying operation. The resultant product is granular and free flowing and may be packaged, stored, handled and transported in bags, fiber drums or any other suitable containers. The product can be readily mixed in a dry state into feeds, fermentation media and the like. Still further, certain forms of the product may be consumed as such without further treatment or mixing by poultry and livestock as dried feed. It appears that soybean millfeed is superior as a carrier to oat hulls, corn cobs, corn oil meal and other commonly used carriers, the superiority being manifested by the physical properties of the finished dried feed product.

While the soybean hulls are particularly absorbent in connection with feed ingredients of the type described, the penetration or impregnation of the feed ingredients can be increased or aided by first wetting or dampening the millfeed with water. Following the dampening of the soybean millfeed, the hygroscopic feed ingredient is mixed therewith and upon adequate stirring or agitation the ingredient impregnates each particle of millfeed to a substantial extent. Following impregnation of the millfeed carrier particle, a conventional uncomplicated form of drying operation is used to remove moisture from the product and transform the same into dry, free flowing condition. With impregnation of the millfeed particles with the hygroscopic feed ingredient, the quantity of the latter carried by each particle is protected from humid atmosphere after drying and during storage. This is particularly true when hygroscopic ingredients of high solids content are used. The millfeed particles can be penetrated and saturated with the hygroscopic ingredients by stirring for a sufficient length of time which has been found to be about 5 minutes or less.

To further aid the extent and rate of penetration of the feed ingredient, heat may be applied to the mixture during impregnation of the carrier particles. Elevating the temperature of the product ingredients may be accomplished in any suitable manner. For example, the water used to wet or dampen the millfeed may be heated or external heat may be applied to the mixture during the impregnation step. Extensive penetration of the hygroscopic ingredient into the millfeed particle not only aids in the subsequent drying of the product but further prevents the formation of aggregates. As previously stated, with the retention of substantially the total initial surface area of the carrier particle following impregnation, moisture can be readily evaporated during the drying operation.

In carrying out the process described above, it has been found advantageous in some instances to neutralize the hydrophyllic and hygroscopic feed ingredient prior to its admixture with the carrier during the absorption or impregnation step. Partial or complete neutralization of the hygroscopic ingredient aids in the reduction of the hygroscopicity of the finished product. Calcium compounds are generally preferred neutralizing agents but other suitable neutralizing agents may be used. Calcium compounds, such as calcium oxide and calcium hydroxide, are added in sufficient quantities to the feed ingredient to establish neutralization or near neutralization before the feed ingredient is admixed with the carrier particles. The millfeed particles may be ground to the desired particle size prior to dampening or impregnation. The amount of water used to wet or dampen the millfeed will depend largely on the moisture content of the hygroscopic feed ingredient, the particle size of the millfeed and the temperature of the mixture during the impregnation operation. The wetting or dampening time required for the added water to penetrate the millfeed will normally be about 5 minutes or less accompanied by stirring.

The neutralized feed ingredient and dampened millfeed particles are mixed together with or without an increase in temperature during the impregnation step of the process. The time required for the hygroscopic ingredient to be absorbed by the wet millfeed, as previously stated, is about 5 minutes at room temperature and less than 5 minutes at elevated temperatures. The drying conditions used will depend upon the heat stability of the product being dried. Molasses or vitamins, for example, are generally heat labile or volatile at temperatures above 100° C. However, for short periods of time, temperatures up to 160° C. may not be significantly destructive. The temperature and time of dehydration will generally be determined for each product. As previously stated, any conventional form of drying equipment may be utilized, it being unnecessary to resort to complicated or expensive equipment due to the manner in which the heat sensitive feed ingredient is protected by the carrier particles.

The following examples are illustrative of the manner in which the product of the present invention is formed. These examples should not be considered as limiting to the scope of the present invention as set forth in the appended claims.

EXAMPLE I 14.3 lbs. of water were added to 10 lbs. of soybean millfeed formed primarily from soybean hulls. The water-millfeed mixture was stirred for 5 minutes. 5 lbs. of calcium hydroxide were dissolved in 50 gals. of a 1 to 1 mixture of blackstrap molasses and hydrol (the mother liquor obtained from acid treatment of starch in forming various related sugars). 27.6 lbs. of the lime-molasses-hydrol mixture were added to and stirred with the dampened millfeed for 5 minutes. The impregnated millfeed particles were then dried by conventional means. The resultant product was free flowing and did not cake or lump during extended storage of the same.

EXAMPLE II 10 lbs. of soybean millfeed were placed in a mixing kettle. 32.5 lbs. of 30° Bé. corn steep liquor neutralized to a pH of 8.0 with about 1.5 lbs. of calcium oxide were added and mixed thoroughly with the millfeed particles for 5 minutes. The impregnated particles were then dried by conventional means to form a free flowing product readily adapted for dry mixing.

EXAMPLE III

To 10 lbs. of soybean millfeed were added 4.73 lbs. of a 70% aqueous solution of choline chloride. The mixture was stirred thoroughly for 5 minutes. Upon drying in a conventional manner the resultant impregnated millfeed particles were non-caking and free flowing.

EXAMPLE IV

From about 1 to 1.5 parts by weight of water were added to 35.9 lbs. of soybean millfeed. To this hull-water mixture 86.2 lbs. of feeding cane molasses were added at a temperature of 100° F. The total mixing time including the addition of water and molasses was 12 minutes. The impregnated particles were dried and formed a free flowing product of the type previously described.

Comparative testing of soybean millfeed, wheat bran, reground oat millfeed, linseed oil meal, sugar beet pulp and alfalfa meal as carriers for the dried molasses product has been carried out. The following procedure was followed and comparative results are listed therebelow.

100 grams of the carrier was dampened with 30 ml. of water with stirring for 2 minutes. 220 grams of a 1 to 1 mixture of hydrol and blackstrap molasses were then mixed into the dampened carrier with stirring for 2 minutes. The mixture was then spread out on aluminum foil and allowed to dry for 5 days at room temperature. The relative humidity of the air was 22%. Samples of each of the six mixtures were then stored for 20 hours in the 50% relative humidity room to test them for hygroscopicity.

Observations (1) At the end of the mixing period all of the mixtures felt quite wet. The linseed oil meal sample was the only one that probably could not have passed through a rotary drier.
(2) After 20 hours of air drying the degree of dryness decreased in the following order:
   (a) Soybean millfeed and alfalfa meal were about the same.
   (b) Wheat bran.
   (c) Sugar beet pulp.
   (d) Reground oat millfeed.
   (e) Linseed oil meal.
(3) After 5 days of air drying all the mixtures were dried to a crispy texture.
(4) After storing the mixtures in the 50% relative humidity room for 20 hours their relative hygroscopicities increased in the following order:
   (a) Soybean millfeed.
   (b) Alfalfa meal.
   (c) Sugar beet pulp.
   (d) Wheat bran.
   (e) Linseed oil meal.
   (f) Reground oat millfeed.

From the foregoing it will be noted that the soybean millfeed consisting essentially of soybean hulls exhibits unique properties as a carrtier in the formation of feed materials. The millfeed particles absorb hygroscopic substances into the body thereof to a substantial extent. This absorption insulates the feed ingredient from high humidity atmospheres and thus prevents caking or lumping of the impregnated carrier particles during subsequent storage or use. Moistening of the millfeed particles and/or neutralization of the feed ingredient prior to the impregnation step hastens impregnation and further increases the extent of penetration of the hygroscopic substance. Use of an elevated temperature during or after admixing of the carrier and feed ingredient also increases the rate and extent of penetration. In this connection it has been found advantageous to utilize water heated to about 90° C. in dampening or wetting the millfeed particles.

Obviously many modifications and variations of the invention as hereinbefore set forth may be made without departing from the spirit and scope thereof, and therefore only such limitations should be imposed as are indicated in the appended claims.

We claim:

1. A dried, free flowing feed material comprising soybean hulls impregnated with a substantial quantity of highly hydrophyllic and hygroscopic feed ingredients.

2. A dried, free flowing feed product comprising soybean hulls impregnated with a substantial quantity of highly hydrophyllic and hygroscopic non-drying feed ingredients.

3. A dried, free flowing feed product comprising soymean hulls impregnated with a substantial quantity of highly hydrophyllic and hygroscopic neutralized feed ingredients.

4. A dried, free flowing feed material comprising soybean hulls impregnated with a substantial quantity of highly hydrophyllic and hygroscopic neutralized molasses.

5. A dried, free flowing feed material comprising soybean hulls impregnated with a substantial quantity of highly hydrophyllic and hygroscopic neutralized corn steep liquor.

6. A dried, free flowing feed material comprising soymean hulls impregnated with a substantial quantity of highly hydrophyllic and hygroscopic choline chloride.

7. A dried, free flowing feed product formed from discrete particles of a soybean millfeed carrier impregnated with a substantial quantity of highly hydrophyllic and hygroscopic feed ingredients.

8. A dried, free flowing feed product formed from discrete particles of a soybean millfeed carrier comprising soybean hulls impregnated with a substantial quantity of neutralized highly hydrophyllic and hygroscopic non-drying feed ingredients.

9. A dried, free flowing feed product formed from discrete particles of a soybean millfeed carrier comprising soybean hulls impregnated with a substantial quantity of neutralized highly hydrophyllic and hygroscopic neutralized feed ingredients.

10. The process of forming a dried, free flowing feed material which comprises, impregnating soybean millfeed formed primarily from soybean hulls with a hydrophyllic and hygroscopic feed ingredient, and, thereafter, drying the same.

11. The process of forming a dried, free flowing feed material which comprises, dampening soybean millfeed formed primarily from soybean hulls, impregnating said millfeed with a hydrophyllic and hygroscopic feed ingredient, and, thereafter, drying the same.

12. The process of forming a dried, free flowing feed material which comprises, dampening soybean millfeed formed primarily from soybean hulls, neutralizing a hydrophyllic and hygroscopic feed ingredient, impregnating said millfeed with said feed ingredient, and, thereafter, drying the same.

13. The process of forming a dried, free flowing feed product which comprises, dampening soybean millfeed formed primarily from soybean hulls, impregnating said millfeed with a hydrophyllic and hygroscopic feed ingredient under elevated temperature conditions, and, thereafter, drying the same.

14. The process of forming a dried, free flowing feed product which comprises, dampening soybean millfeed formed primarily from soybean hulls, neutralizing a hydrophyllic and hygroscopic feed ingredient, impregnating said millfeed with said feed ingredient under elevated temperature conditions, and, thereafter, drying the same.

15. The process of forming a dried, free flowing feed product which comprises, dampening soybean millfeed formed primarily from soybean hulls, neutralizing a hydrophyllic and hygroscopic feed ingredient with a calcium compound, impregnating said millfeed with said feed ingredient under elevated temperature conditions, and, thereafter, drying the same.

16. The process of forming a dried, free flowing feed product which comprises, dampening soybean millfeed formed primarily from soybean hulls by stirring the same with water for approximately 5 minutes, neutralizing a hydrophyllic and hygroscopic feed ingredient, impregnating said millfeed with said feed ingredient, and, thereafter, drying the same.

17. The process of forming a dried, free flowing feed product which comprises, dampening soybean millfeed formed primarily from soybean hulls by stirring the same with hot water for approximately 5 minutes, neutralizing a hydrophyllic and hygroscopic feed ingredient, impregnating said millfeed with said feed ingredient by stirring the combined millfeed and feed ingredient for approximately 5 minutes, and, thereafter, drying the same.

18. The process of forming a dried, free flowing feed product which comprises, dampening soybean millfeed formed primarily from soybean hulls by stirring the same with water for approximately 5 minutes, neutralizing a hydrophyllic and hygroscopic feed ingredient with a calcium compound, impregnating said millfeed with said feed ingredient by stirring the combined millfeed and ingredient for approximately 5 minutes under elevated temperature conditions, and, thereafter, drying the same.

References Cited in the file of this patent

UNITED STATES PATENTS

| Re. 24,261 | Martin | Dec. 25, 1956 |
| 2,427,520 | Briod | Sept. 16, 1947 |

FOREIGN PATENTS

| 9,416 | Great Britain | 1906 |

OTHER REFERENCES

Morrison: Feeds and Feeding, 21st ed., 1951, Ithaca, N.Y., p. 538.